United States Patent [19]

Hihara et al.

[11] Patent Number: 4,958,685
[45] Date of Patent: Sep. 25, 1990

[54] METHOD FOR PLUGGING LOST CIRCULATION AREAS AND LOST CIRCULATION MATERIAL TO BE USED THEREFOR

[75] Inventors: Takeshi Hihara, Zushi; Masahide Yanagiya; Kazuhito Ono, both of Yokosuka, all of Japan

[73] Assignee: Toho Kagaku Kogyo Co., Ltd., Japan

[21] Appl. No.: 356,348

[22] Filed: May 24, 1989

[30] Foreign Application Priority Data

May 27, 1988 [JP] Japan .................................. 63-128186

[51] Int. Cl.$^5$ .......................................... E21B 33/138
[52] U.S. Cl. ..................................... 166/291; 166/295; 175/72; 523/130
[58] Field of Search ................... 166/291, 295; 175/72; 523/130; 252/8.512

[56] References Cited

U.S. PATENT DOCUMENTS

| | | | |
|---|---|---|---|
| 2,867,278 | 1/1959 | Mallory et al. | 523/130 X |
| 2,889,883 | 6/1959 | Santora | 523/130 X |
| 3,181,611 | 5/1965 | Dollarhide | 166/295 |
| 3,688,845 | 9/1972 | Messenger | 166/291 |
| 3,878,686 | 4/1975 | Hageman et al. | 166/295 X |

Primary Examiner—George A. Suchfield
Attorney, Agent, or Firm—Oliff & Berridge

[57] ABSTRACT

A method for plugging the areas of lost circulation occurred during the drilling of a well with the use of a drilling mud, and a lost circulation material to be used therefor. The lost circulation material comprising 1 to 90 parts by weight of a water-soluble solvent containing no active hydrogen atoms and hardly miscible with mineral oils and 10 to 99 parts by weight of a hydrophlic urethane prepolymer, and the method comprises injecting through the drilling pipe the lost circulation material sandwiched by a spacer of mineral oils, so as to allow the lost circulation material to penetrate into the lost circulation areas, to react with water which is present at the areas, and to plug the areas through its polymerization.

5 Claims, 1 Drawing Sheet

METHOD FOR PLUGGING LOST CIRCULATION AREAS AND LOST CIRCULATION MATERIAL TO BE USED THEREFOR

BACKGROUND OF THE INVENTION

1. Field of the Invention

The present invention relates to a method for plugging lost circulation areas generated at the time when an oil or gas well is drilled with the use of a drilling mud and to a lost circulation material to be used therefor, which comprises a mixture of a hydrophilic urethane prepolymer and a water-soluble solvent containing no active hydrogen atoms and hardly miscible with mineral oils.

2. Description of the Related Art

In conventional way as shown in FIG. 3, in the drilling of oil wells, geothermal wells, etc., there has been used drilling muds 1 containing bentonite dispersed in water, so as to make it possible to carry away cuttings by a drill 2 and to form a clay wall. However, as shown in FIG. 4, the phenomenon 5 of lost circulation often occurs when a borehole is drilled through a porous formation, such as a sand or gravel layer. The lost circulation, if remains uncontrolled, not only causes the loss of drilling muds in large quantities, but also brings about such troubles as collapsing, caving and stucking. It is therefore of vital importance to clog up the areas of lost circulation as soon as it takes place.

Various methods have been employed to solve the problem of lost circulation. In one method, a drilling mud incorporated with a plugging material, such as shavings, rock wool, mica, granules of plastics, asbestos, glass fiber, etc. and a viscosifier, such as carboxymethyl cellulose, is circulated or supplied to the areas of lost circulation. However, this method suppresses lost circulation only temporarily, and in most cases lost circulation occurs once again soon after the resumption of the drilling. In one method employed to prevent the reoccurrence of lost circulation, water glass or cement is injected into the areas of lost circulation. However, the use of water glass is insufficient in its effect. The injection of cement is also insufficient in its effect and involves the danger of the stucking of the tubing. In addition, the hardening of both water glass and cement proceeds only slowly, and hence satisfactory results could hardly be attained.

An object of the present invention is to improve the method for plugging the areas of lost circulation occurring at the time when an oil or gas well is bored by the use of a drilling mud.

Another object of the present invention is to provide a lost circulation material to be used for the plugging of the areas of lost circulation.

SUMMARY OF THE INVENTION

According to the present invention, there is provided a method for plugging the areas of lost circulation occurred during the drilling of a well, e.g., a gas well or an oil well, with the use of a drilling mud circulated through a drilling pipe, which method comprises injecting through the pipe (i) a mineral oil, (ii) a lost circulation material comprising 10 to 99 parts by weight of a hydrophilic urethane prepolymer and 1 to 90 parts by weight of a water-soluble solvent containing no active hydrogen atoms and hardly miscible with the mineral oil, and then (iii) the same mineral oil, so as to allow the lost circulation material to come down through the pipe in a manner sandwiched by the mineral oil functioning as a spacer and to penetrate into the areas of lost circulation, at which the urethane prepolymer comes into contact with water and hardens to effect the plugging of the areas.

There is also provided by the present invention a lost circulation material consisting of a mixture comprising a hydrophilic urethane prepolymer (plugging material) and a water-soluble solvent containing no active hydrogen atoms and hardly miscible with a mineral oil (spacer). With the use of the solvent, the hydrophilic polyurethane prepolymer is prevented from dissolving into the spacer, in which it may come into contact with water and harden before its penetration into the lost circulation areas.

DETAILED DESCRIPTION OF THE INVENTION

As described above, the lost circulation material of the invention comprises a hydrophilic urethane prepolymer and a solvent which is soluble to water but hardly miscible with mineral oils. The use of such a solvent not only makes it easier to handle the hydrophilic urethane prepolymer through reduction in viscosity, but also promotes the dissolving or dispersion of the prepolymer into water contacted with it. It also has the function of preventing the dissolving of the prepolymer into mineral oils used as a spacer. In cases where the lost circulation material is used at a cold site, the selection of the solvent is important in order to prevent the coagulation of the material.

The hydrophilic urethane prepolymer, when reached the areas of lost circulation, comes into contact with water contained in the formation and immediately start polymerization through reaction with water. During the course of the polymerization, the viscosity of the prepolymer increases, and viscous substances and then tough rubber-like elastic substances are formed within a short period of time. The thus formed continuous solids are capable of effectively functioning as a plugging material.

Figure 1:
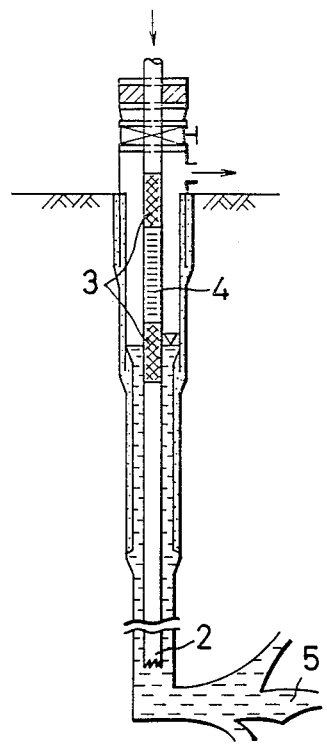
FIG. 1 is a sectional side view showing the state where the spacer and the lost circulation material of the present invention are injected in the pipe for the use of a drilling mud.
Figure 3:
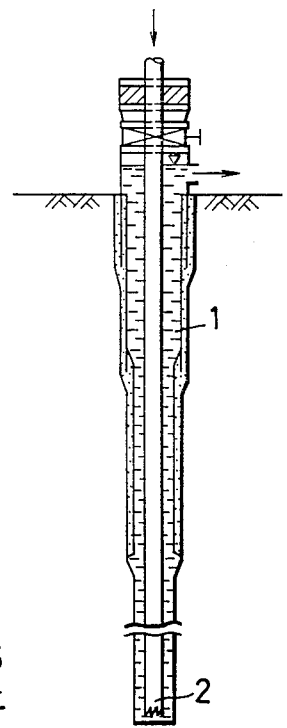
FIG. 3 is a sectional side view of the conventional method of the drilling of oil wells with the use of a drilling mud.
Figure 4:
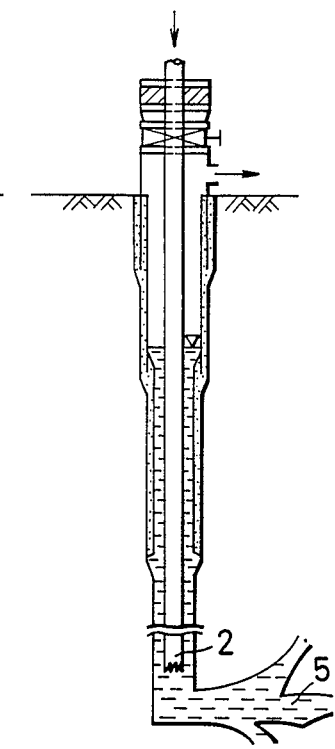
FIG. 4 is a sectional side view showing the state where the drilling mud pressure is decreased due to the lost circulation areas during the drilling well in the conventional way.

For the injection, there can be employed the equipment used for the circulation of drilling muds. It can be most practical and effective to inject firstly a mineral oil readily available at the drilling site, secondly the lost circulation material according to the invention, and thirdly the same mineral oil as the one injected at first. Examples of hydrophilic urethane prepolymers usable in the invention include those prepared by allowing an excessive amount (based on mole) of an organo diisocyanate or a mixture of organo diisocyanates to react with one or more polyalkylene glycols having a molecular weight of 3,000 to 15,000 and containing two or more hydroxyl groups at the terminals of the molecules, said polyalkylene glycol(s) being prepared through the addition polymerization of one or more low molecular, active hydrogen-containing compounds (such as ethylene glycol, propylene glycol, glycerol, trimethylolpropane, diglycerol, pentaerythritol, sorbitol and the like) with ethylene oxide and/or alkylene oxides containing 3 or more carbon atoms (such as, propylene oxide, styrene oxide and the like) with the ratio of addition polymerization of from 100:0 to 60:40. Of alkylene oxides containing 3 or more carbon atoms, propylene oxide can be most advantageous from economic point of view. In the case of copolymerization with ethylene oxide, it can be either block or random copolymerization.

As examples of organo diisocyanates to be reacted with such polyalkylene glycols, mention may be made of aromatic and fatty diisocyanates, such as 2,4-tolylene diisocyanate, 2,6-tolylene diisocyanate and mixtures of these, 4,4-diphenylmethane diisocyanate, xylylene diisocyanates, isophorone diisocyanate, 5,5-trimethylcyclohexyl isocyanate, 6-hexamethylene diisocyante, 2,2,4-trimethylhexamethylene diisocyanate, and the like. Of these diisocyanates, 2,4- and 2,6-isomer or a mixture of tolylene diisocyanates, isophorone diisocyanate and xylene diisocyanates can be particularly preferable.

Examples of usable water-soluble solvents containing no active hydrogen atoms include acetone, methyl ethyl ketone, dioxane, tetrahydropyran, dimethylformamide, dimethylsulfoxide, acetonitrile, acetoamide, N-methylpyrrolidone, γ-butyrolactone, diethylene glycol dimethyl ether, triethylene glycol dimethyl ether, tetraethylene glycol dimethyl ether, diethylene glycol methyl ethyl ether, monoethylene diethyl ether, diethylene glycol diethyl ether, and the like. It is required that solvents used in the present invention are soluble to water, contain no active hydrogen atoms and, at the same time, are hardly soluble to mineral oils used as a spacer at the time of injection. In addition, the solvents, in the case where they are used in a cold region, must have a low coagulation point. It is also preferred that the solvents have a high flashing point for the safety of handling at the working site. In view of these requirements, the following solvents can be particularly preferable: N-methylpyrrolidone, γ-butyrolactone, diethylene glycol dimethyl ether, triethylene glycol dimethyl ether, diethylene glycol diethyl ether and diethylene glycol methyl ethyl ether.

EXAMPLE 1

Figure 2:
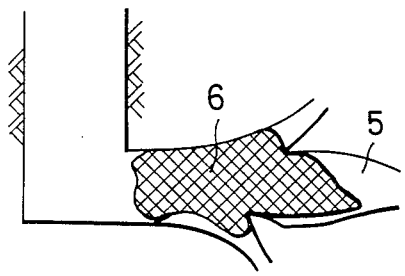
FIG. 2 is a fragmental and sectional side view of the area of lost circulation which is plugged by the lost circulation material of the present invention due to the hardening of the same 6.

During the drilling of an oil well as schematically shown in FIG. 2, vigorous lost circulation 5 occurred through cracks in a fractured stratum extending along a dislocation at the depth of 650 m. In an attempt to stop the lost circulation, cement liquid was injected twice (10 tons each), but the lost circulation did not stop.

Then, Lost Circulation Material (1) according to the invention (shown in Table 1) was employed in the following manner as illustrated in FIG. 1: At first, 200 liters of kerosene as a spacer 3 was pumped down through the drilling pipe, and then 500 Kg of Lost Circulation Material 4 was supplied to the lost circulation area at a time. Thereafter, 300 liters of kerosene as a spacer 3 was injected therein. After the pumping had been suspended for one hour, circulation of the drilling mud was resumed. No loss of drilling mud was observed, and the drilling operation could be performed without any troubles.

EXAMPLE 2

Lost circulation occurred at the depth of 1,770 m when the specific gravity of the drilling mud was slightly increased. Soon it became impossible to circulate the drilling mud, and the drilling operation was suspended. Immediately after the suspension of the operation, 200 Kg of kerosene and then 400 Kg of Lost Circulation Material (2) were pumped down, followed by the injection of 200 liters of kerosene. Pumping down was suspended for 1 hour, during which the lost circulation could be completely suppressed. It was possible to resume the drilling operation without any loss of drilling mud.

EXAMPLE 3

Lost circulation occurred during the drilling of a gas well through a soft gravel stratum at the depth of 220 m. Although 3 tons of cement liquid was injected therein, the lost circulation did not cease. In order to control the lost circulation, Lost Circulation Material (3) was employed in the following manner: 200 liters of kerosene was pumped down through the drilling pipe, and then 400 Kg of the lost circulation material was injected therein. Subsequently, additional 200 liters of kerosene was pumped down. After 1 hour, the drilling mud was circulated to confirm that the lost circulation had completely stopped. After the confirmation, the drilling operation was resumed.

EXAMPLE 4

Lost circulation occurred at the depth of 1,310 m during the drilling of an oil well. It was presumed, on the ground of vigorousness of the lost circulation, that the drilling mud was escaping through cracks formed in a formation of hard sandstone. Since it did not stop even after the injection of 20 tons of cement liquid, 500 Kg of Lost Circulation Material (4) was injected through the drilling pipe, thereby using 400 liters each of kerosene (spacer) in a manner the material be sandwiched by the spacer. After 1 hour, 500 Kg of Lost Circulation Material (4) was again supplied to the lost circulation area in the same manner as above. The lost circulation stopped completely within 1 hour, and the circulation of the drilling mud and the drilling operation were resumed.

It would be apparent from the results of the examples that lost circulation can be brought under control completely and more rapidly by the use of the lost circulation materials according to the invention, compared with prior methods.

TABLE 1

| | Lost Circulation Material Used | Molecular Weight of PAG(*1) | Organic DICN (*2) Used | Molar Ratio of PAG to DICN | Reaction Conditions (In dry $N_2$) | Solvents Used and Their Percentages Admixed |
| --- | --- | --- | --- | --- | --- | --- |
| Example 1 | (1) | 3,000(*3) | TDI(*4) | 5 | 90° C. 3 hrs | Y-Butyrolactone 25% |
| Example 2 | (2) | 6,000(*5) | XDI(*6) | 6 | 110° C. 5 hrs | N-Methylpyrrolidone 20% Diethylene glycol dimethyl ether 10% |
| Example 3 | (3) | 9,000(*7) | XDI IPDI(*8) | 4 5 | 110° C. 5 hrs | Y-Butyrolactone 25% Diethylene glycol dimethyl ether 10% |
| Example 4 | (4) | 13,000(9) | IPDI | 7 | 110° C. 6 hrs | Y-Butyrolactone 30% Triethylene glycol dimethyl ether 10% |

[Notes]
*1: Polyalkylene glycol
*2: Diisocyanate
*3: Addition product of propylene glycol with ethylene oxide and propylene oxide (90:10 based on weight)
*4: Tolylene diisocyanate
*5: Addition product of glycerol with ethylene oxide and propylene oxide (85:15 based on weight)
*6: Xylylene diisocyanate
*7: Addition product of diglycerol with ethylene oxide and propylene oxide (70:30 based on weight)
*8: Isophorone diisocyanate
*9: Addition product of glycerol with ethylene oxide and propylene oxide (80:20 based on weight)

What is claimed is:

1. A method for plugging the areas of lost circulation occurred during the drilling of a well with the use of a drilling mud circulated through a drilling pipe, which method comprises injecting through the pipe (i) a mineral oil, (ii) a lost circulation material comprising a hydrophilic polyurethane prepolymer and a water-soluble solvent containing no active hydrogen atoms and hardly miscible with the mineral oil, and then (iii) the same mineral oil, so as to allow the urethane prepolymer to come down through the pipe in a manner sandwiched by the mineral oil functioning as a spacer and to penetrate into the lost circulation areas, at which the prepolymer reacts with water and plugs the areas through its polymerization.

2. A method as claimed in claim 1, wherein said lost circulation material comprises said hydrophilic urethane prepolymer in an amount of 10 to 99 parts by weight and said solvent in an amount of 1 to 90 parts by weight.

3. A method as claimed in claim 1, wherein said hydrophilic urethane prepolymer is a product obtained by reacting an isocyanate with a polyalkylene glycol having a molecular weight of 3,000 to 15,000, said polyalkylene glycol being a product having an addition polymerization ratio of ethylene oxide and propylene of from 100:0 to 60:40.

4. A method as claimed in claim 3, wherein said isocyanate is one or more members selected from the group consisting of tolylene diisocyanate, isophorone diisocyanate, xylylene diisocyanate and diphenylmethane diisocyanate.

5. A method for plugging areas of lost circulation encountered during the drilling of a well with the use of a drilling mud circulated through a drilling pipe, said method comprising injecting through the pipe (i) a mineral oil, (ii) a lost circulation material comprising a hydrophilic polyurethane prepolymer and a water-soluble solvent containing no active hydrogen atoms and hardly miscible with the mineral oil, and then (iii) the same mineral oil, so as to allow the urethane prepolymer to come down through the pipe in a manner sandwiched by the mineral oil functioning as a spacer and to penetrate into the lost circulation areas, where the prepolymer reacts with water and plugs the areas through its polymerization, said water-soluble solvent containing no active hydrogen atoms and hardly miscible with mineral oils is one or more members selected from the group consisting of diethylene glycol dimethyl ether, triethylene glycol dimethyl ether, diethylene glycol diethyl ether, diethylene glycol methyl ethyl ether, N-methylpyrrolidone and γ-butyrolactone.

* * * * *